Aug. 31, 1926.
H. F. PARKER
1,598,002
AIRCRAFT HEAT EXCHANGE SYSTEM
Filed April 10, 1922   3 Sheets-Sheet 2
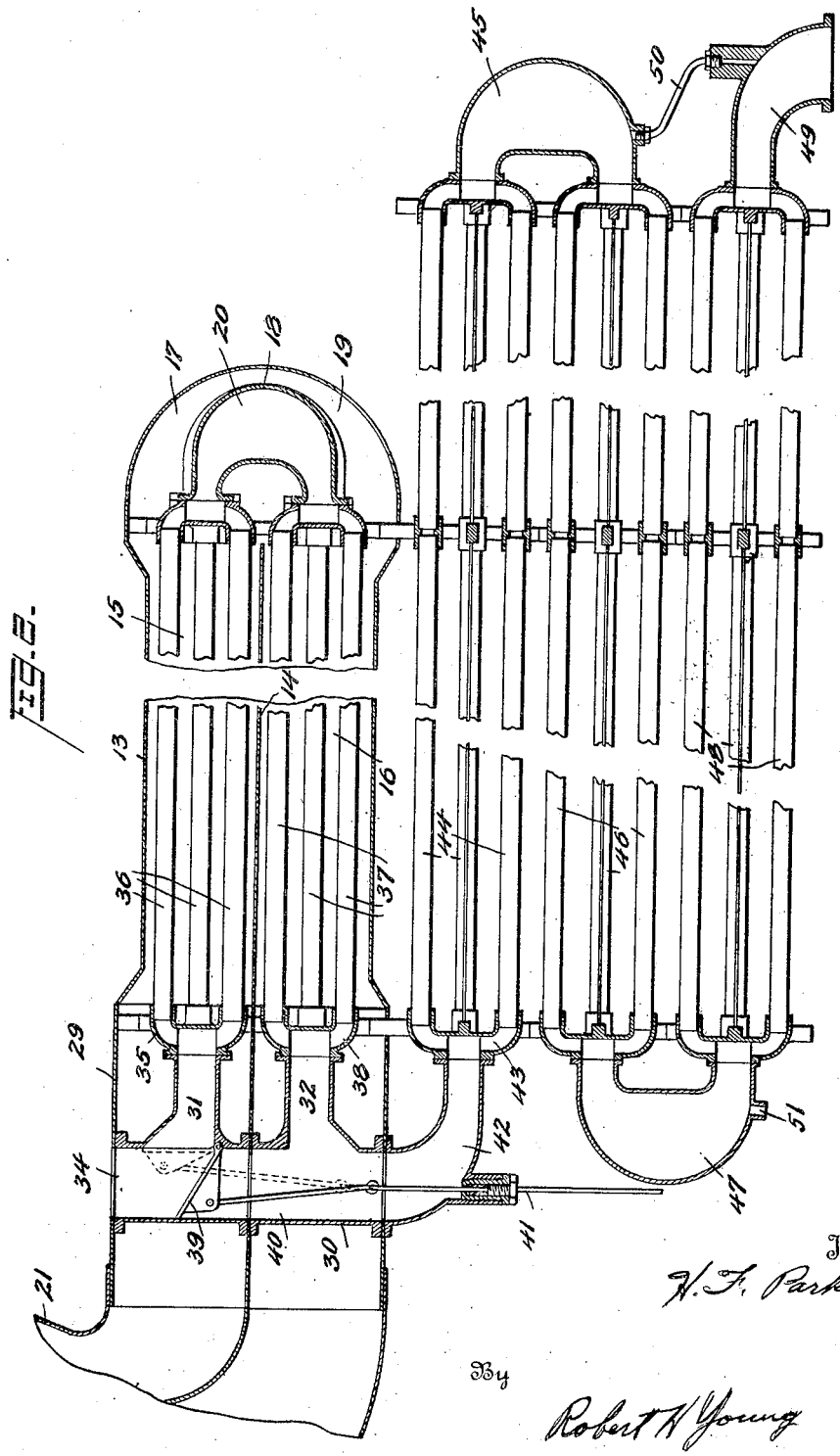

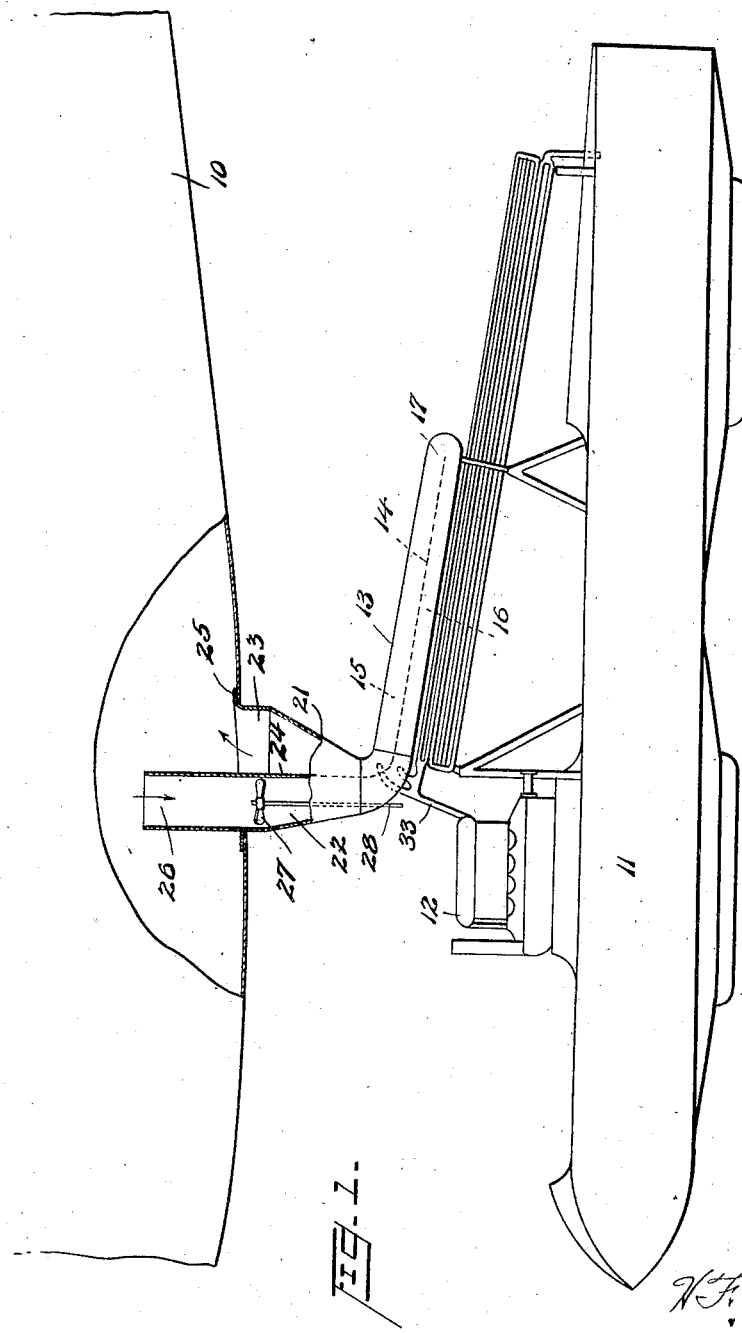

Aug. 31, 1926.
H. F. PARKER
1,598,002
AIRCRAFT HEAT EXCHANGE SYSTEM
Filed April 10, 1922    3 Sheets-Sheet 3
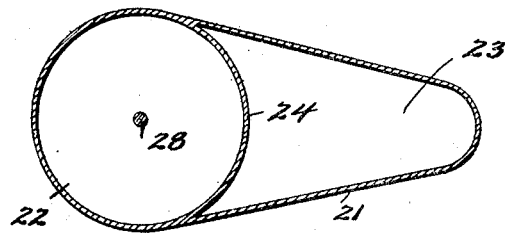
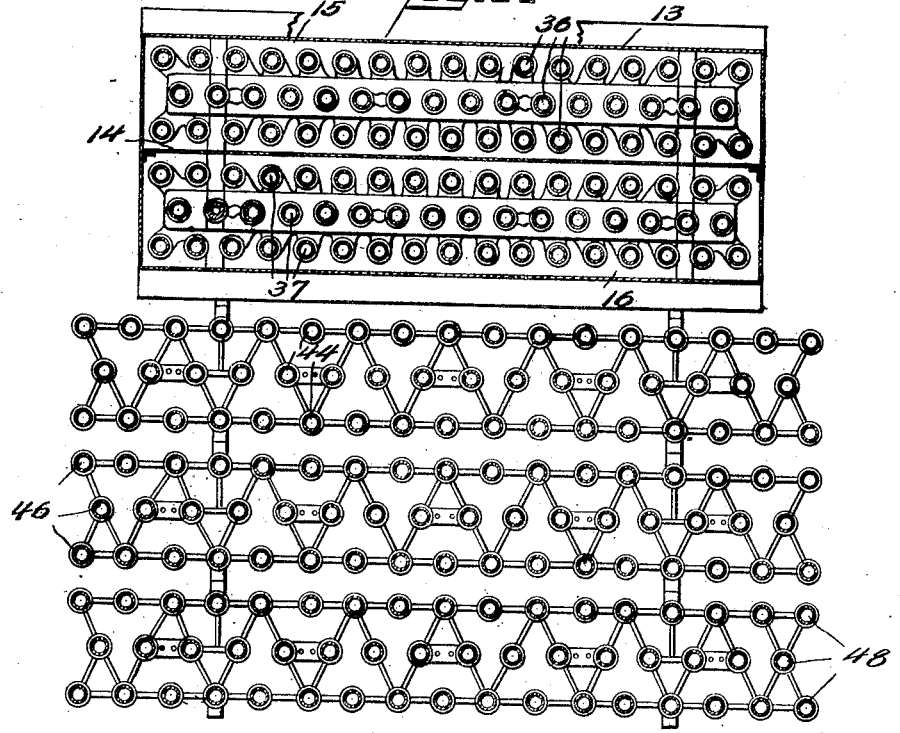

Patented Aug. 31, 1926.

1,598,002

UNITED STATES PATENT OFFICE.

HUMPHREY F. PARKER, OF NEW YORK, N. Y.

AIRCRAFT HEAT-EXCHANGE SYSTEM.

Application filed April 10, 1922. Serial No. 551,281.

This invention relates to aircraft and particularly airships of the lighter than air, dirigible type.

The broad object of the invention is to maintain the equilibrium of the aircraft or in other words render uniform the buoyancy or lift of the ship notwithstanding atmospheric and temperature changes and also notwithstanding the loss of weight brought about by the consumption of liquid fuel, such as gasoline.

Ordinarily the buoyant gas, such as hydrogen or helium with which the gas bag is filled is subjected to sudden variations in temperature, as for example, when the sun is obscured by a cloud, or when the chill of evening comes on. By means of the present invention the gas may be kept at a uniform temperature day and night and the buoyancy thereof maintained.

Another difficulty which has interfered with the practicability of airships has been the reduction of weight due to the consumption of liquid fuel, making it hard, if not impossible, to land the airship without valving the gas which is a highly undesirable expedient for reasons well known to those conversant in the art. By means of the present invention, a heat exchange is effected between the exhaust gases from the engine of the aircraft and the atmosphere, and, at times, the buoyant gas, and an amount of water equal in weight to the fuel consumed is recovered and used as ballast. In this way the weight of the fuel is compensated for and it is done automatically. By this means it is possible to maintain the total weight of the airship and avoid valving the lifting gas.

In this invention it is proposed to condense water by passing the exhaust gases from the engine of the airship through a number of tubes of small diameter arranged in parallel and exposing said tubes to air currents or the cooling influence of the lifting gas, or both. This may be effected by placing the condensing tubes on the outside of the airship structure where they are exposed to the airstream due to the motion of the airship and propeller blast, or means may be used to obtain an even higher air velocity past the tubes than is possible by direct exposure, as by enclosing them in a tunnel or conduit and using artificial means to increase the velocity of the air.

The invention consists in the novel construction, combination and arrangement herein fully described.

In the accompanying drawings:—

Figure 1 is a side elevation, partly in section of the apparatus as applied to an airship;

Figure 2 is an enlarged side elevation, partly in section of the apparatus;

Figure 3 is a vertical cross section through the same;

Figure 4 is a horizontal section through the intake and outlet manifold.

In the illustrated embodiment of the invention, the heat exchange apparatus is shown as situated under the gas bag 10 of a dirigible airship and above the car 11 upon which it is supported with one end adjacent to the engine 12 of the craft.

The first unit of the apparatus to be described may be referred to as a heater for the lifting gas contained in the gas bag 10 and said unit is shown arranged above the second unit which may be referred to as the condenser. The structure of the two units are similar but the condenser, which underlies the heater is of greater length and comprises longer tubes than the heater for a reason which will become apparent as the description proceeds.

The lifting gas heater embodies a casing 13 having a baffle plate 14 shown as arranged centrally and extending longitudinally thereof forming two superposed heating chambers 15 and 16 which constitute parts of a conduit through which the lifting gas is circulated while being heated. The chambers 15 and 16 are connected by a return header 17 which may consist of one or more units or sections as will appear. The header 17 is divided by an interior wall or partition 18 into a lifting gas passage 19 and an engine exhaust passage 20.

The casing 13 communicates with a combined intake and outlet manifold 21 having an intake passage 22 and an outlet passage 23, said passages being separated by a partition wall 24. The manifold 21 is of streamline formation as shown in Fig. 4 to cut down head resistance, and has a top flange 25 by which it is secured by fastening means to the bottom of the gas bag 10. Extending upwardly from the entrance of the outlet passage 23 of the manifold 21 is a chimney 26 of sufficient height to discharge the heated lifting gas well above the bottom of the gas bag, the cooler gas in the bottom of the bag being drawn into the intake passage 22 of the manifold and caused to circulate through the chambers 15 and 16 of the heating conduit by means of a fan 27 situated above the intake passage 22 and fast on a rotary shaft 28 driven by the engine of the airship.

Where the manifold 21 connects with the casing 13, the latter has an enlarged neck portion 29, containing a manifold or header 30. This manifold embodies inlet and outlet passages 31 and 32 for the hot exhaust gases from the engine 12 from which an exhaust pipe 33 leads to the inlet 34 of the manifold or header 30.

At the discharge end of the passage 31 there is a fitting 35 having branches to which are connected tubes 36 extending lengthwise within the chamber 15 of the gas heating conduit. In like manner other tubes 37 are connected to a similar fitting 38 at the receiving end of the outlet passage 32 of the header 30. The return header 17 connects the other ends of the tubes 36 and 37 through the passage 20, and the passage 19 of the return header connects the adjacent ends of the chambers 15 and 16 of the gas heating conduit. The passages 19 and 20 are of a capacity equal to or greater than the chambers and tubes communicating therewith to eliminate back pressure.

As shown, there are three tubes 36 and three tubes 37 (see Fig. 2) in each tier, and about sixteen or seventeen tubes in each horizontal row (see Fig. 3). Thus there are about one hundred tubes 36 and 37 in the gas heating unit of the apparatus, this having been found sufficient to produce the required heat exchange to maintain the equilibrating temperature of the lifting gas in the bag 10. One hundred tubes are found sufficient to transfer the heat from a 300 H. P. engine to the lifting gas of an airship of two hundred thousand cubic feet capacity.

A valve 39 controls the main passage 40 of the header 30 and is shifted by means of an operating rod 41 suitably articulated as shown, and extending downward for manual control. When the valve 39 closes the passage 40, as shown in Fig. 2, the hot exhaust from the engine is directed through the heating conduit and thence out through the discharge nozzle 42 at the bottom of the header 30. The lifting gas passing through the heating conduit is thereby heated and in turn reduces the temperature of the engine exhaust. When the valve 39 is shifted to close the passage 31, the passage 40 is left open and then the hot engine exhaust is by-passed directly to the discharge nozzle 42. When, for example, the rays of the sun are heating the gas bag, the valve 39 is shifted to divert the hot exhaust from the tubes 36 and 37. When the sun is obscured by a cloud, the valve 39 is shifted to its other position and the hot exhaust is caused to pass through the tubes 36 and 37 and maintain the temperature of the lifting gas. Thus the lifting gas may be maintained at the proper temperature despite varying atmospheric temperature changes and conditions. The equilibrium of the airship as far as the lifting quality of the buoyant gas is concerned is thus maintained.

The water recovery unit or condenser embodies a structure similar to but of greater capacity than the heating unit above described. The condenser is composed of about 150 tubes and as shown is divided into three groups of tubes, the exhaust passing successively through the tubes in the first group, then through the tubes in the second group, and finally through the tubes in the third group. Each group comprises three rows of tubes with 16 or 17 tubes in each row, making 50 tubes in the group. The diameter of the tubes is one inch, and the length of each tube in each group is twenty feet, making a total length of passage for the exhaust of sixty feet. The tubes just referred to apply to apparatus sufficient to condense water from the exhaust of a 300 horsepower engine.

The exhaust passes from the passage 30 through the header 42 to the distributor header 43 to the tubes 44 of the upper group, said tubes are connected by a returner header 45 to the tubes 46 of the next lower group. The last named tubes are connected by a second return header 47 to the tubes 48 of the bottom group. Finally the engine exhaust after passing throughout the system of tubes 44, 46 and 48 emerges from an outlet nozzle 49 at approximately atmospheric temperature and pressure. After leaving the nozzle 49, the exhaust gases may be passed through a separator and the recovered water is then pumped or otherwise conducted into the ballast chamber of the airship. A drain connection 50 leads from the header 45 to the discharge nozzle 49 to carry on water of condensation which may accumulate in the header 45. Likewise the header 47 may have a condensation drain outlet 51 for the same purpose.

Methods that have been heretofore available for cooling gases in other branches of engineering are not effective for the cooling of exhaust gases on airships. When water is used to cool the exhaust, fouling occurs owing to the deposit of soot and oil either on the tubes themselves is a surface condenser, or in the water in a jet spray condenser. In either case a rapid falling off in efficiency occurs, altho the apparatus may have given the desired performances initially.

In the invention above described, the heat is transferred from the exhaust directly to the air. A much larger area of cooling surface has been rendered necessary, but the resistance to the heat flow caused by the usual carbon deposit is proportionately very much less, partly because the deposit per unit area is less, and partly because the unit resistance to heat flow of the two films of gas is much greater than that of a film of gas and a film of water. The resistance due to a given deposit of carbon is then a smaller proportion of the total resistance in the case of my invention.

It is not sufficient however, to provide an apparatus in which the cooling is done by air; an unusual proportion of surface is necessary. If the exhaust be driven past the cooling surfaces at high velocity, which is desirable to secure efficiency, then there will be considerable loss of power due to back pressure, since the tubes, if of reasonable diameter would be excessively long, or, if of reasonable length, will be impracticably small.

By limiting the velocity, the length is still much greater than would be expected, but the back pressure may be reduced to a reasonable figure. I have found that with a velocity of substantially between the limits of one pound to two pounds of exhaust per square inch of cross section of conduit per minute, the back pressure is not excessive in spite of the length, which is from three hundred and fifty to five hundred times the diameter. An efficient apparatus is obtained by the use of a tube of one inch diameter and sixty feet in length for each six horse power delivered by the motor. If this rate of flow is materially increased the loss due to backpressure becomes appreciable.

The above described apparatus effects this condensation only by virtue of the proportions of the tubes and the manner in which they are arranged. Material departure from these proportions will render the apparatus so inefficient as to be inoperative. It is first necessary to specify a rate of flow for the exhaust gas through the tubes. If this is too low the heat transfer efficiency is low, more surface is needed to do the necessary amount of cooling, and the apparatus becomes objectionable on account of excessive weight; if the apparatus is designed on the basis of heat transfer efficiency and the exhaust passed through at a high rate of speed, it will fail on account of excessive backpressure which will seriously affect the performance of the engine. I have found that a rate of flow corresponding to the passage of the exhaust from a 300 horsepower motor through fifty tubes one inch in diameter avoids the troubles mentioned. This corresponds to a rate of flow of one pound of exhaust gas per minute per square inch of cross section of tube. Since airship motors are normally operated at about half power only this optimum rate of flow should be chosen for this condition. The maximum figure which it is undesirable to exceed is two pounds of exhaust per square inch of cross section of exhaust passage per minute. In the apparatus described above three pounds of exhaust per hour flows over each square foot of cooling surface. It will be noted that the ratio of the length of passage through which the exhaust passes, i. e. the combined lengths of the tubes in groups 44, 46 and 48, compared with the diameter chosen, is unusually great, being in the case described 720 to 1. This excessive length to diameter ratio is a feature of the invention, since attempts to use a ratio of less than 400 to 1 will result in undesirable loss of efficiency. Finally, the tube diameter affects the operation of the apparatus, diameter of one inch having been found suitable. Diameters of less than three quarters of an inch or more than one inch and a quarter will result in an impracticable apparatus, the latter through inefficiency and increased weight, and the former through excessive backpressure and rapid clogging of the tubes with soot deposits.

As a result of the whole heat exchange system, the lifting efficiency of the buoyant gas is maintained, the total weight of the airship is rendered constant. In this way the equilibrium of the airship is maintained and its control and maneuverability insured without having to valve off lifting gas.

I claim:—

In aircraft, the combination with a gas bag, of a conduit situated outside of the gas bag but having circulating communication therewith, a heat exchange apparatus situated within said conduit, a supply of heat for use in said heat exchange apparatus, means for circulating the contents of the gas bag through said conduit, a streamlined manifold forming a communicating connection between said conduit and the gas bag and having intake and outlet passages, and means for discontinuing at will the supply of heat to the heat exchange apparatus.

In testimony whereof I have affixed my signature.

HUMPHREY F. PARKER.